(12) United States Patent
Corder et al.

(10) Patent No.: US 8,126,619 B2
(45) Date of Patent: Feb. 28, 2012

(54) WEIGHT CALCULATION COMPENSATION

(75) Inventors: Paul John Corder, Auckland (NZ);
David Warren Lee, Waitakere (NZ)

(73) Assignee: Actronic Limited, Auckland (NZ)

( * ) Notice: Subject to any disclaimer, the term of this patent is extended or adjusted under 35 U.S.C. 154(b) by 572 days.

(21) Appl. No.: 12/256,787

(22) Filed: Oct. 23, 2008

(65) Prior Publication Data

US 2009/0127031 A1 May 21, 2009

Related U.S. Application Data

(60) Provisional application No. 60/981,838, filed on Oct. 23, 2007.

(30) Foreign Application Priority Data

Jan. 29, 2008 (NZ) .................................. 565545

(51) Int. Cl.
*G06F 19/00* (2006.01)
*B66F 9/00* (2006.01)
*E02F 3/40* (2006.01)

(52) U.S. Cl. ............... 701/50; 187/393; 37/444; 700/89

(58) Field of Classification Search ............... 187/393, 187/394; 37/234, 235, 236, 444; 700/89; 701/50; 177/131, 148, 149, 245, 264; 212/283
See application file for complete search history.

(56) References Cited

U.S. PATENT DOCUMENTS

| | | | | | |
|---|---|---|---|---|---|
| 3,231,035 | A | * | 1/1966 | Wise | 177/139 |
| 3,910,363 | A | * | 10/1975 | Airesman | 177/139 |
| 4,491,190 | A | * | 1/1985 | Mayfield | 177/139 |
| 4,511,974 | A | * | 4/1985 | Nakane et al. | 701/124 |
| 4,792,004 | A | * | 12/1988 | Sheffield | 177/141 |
| 5,067,572 | A | * | 11/1991 | Kyrtsos et al. | 177/139 |
| 5,209,361 | A | * | 5/1993 | Grubb, Jr. | 212/283 |
| 5,666,295 | A | * | 9/1997 | Bruns | 702/174 |
| 5,850,057 | A | * | 12/1998 | Veillette | 177/212 |
| 5,995,001 | A | * | 11/1999 | Wellman et al. | 340/438 |
| 6,050,770 | A | * | 4/2000 | Avitan | 414/636 |
| 6,611,746 | B1 | * | 8/2003 | Nagai | 701/50 |
| 6,785,597 | B1 | * | 8/2004 | Farber et al. | 701/50 |

* cited by examiner

*Primary Examiner* — Bret Hayes
(74) *Attorney, Agent, or Firm* — Dann, Dorfman, Herrell and Skillman, P.C.

(57) ABSTRACT

A method and apparatus for determining weight of a payload lifted by a rig of a load lifting machine. The weight is determined from at least one parameter being or indicative of the force or pressure existing in or applied by the rig while the payload is lifted and a compensation for friction and/or other losses in the rig 14.

27 Claims, 6 Drawing Sheets

WEIGHT CALCULATION COMPENSATION

CROSS REFERENCE TO RELATED APPLICATION

This application claims the benefit of U.S. Provisional Application No. 60/981,838, filed Oct. 23, 2007, the entirety of which is incorporated herein by reference.

FIELD OF THE INVENTION

The present invention relates to compensation for friction and/or other losses in weight calculation of payloads being lifted by a load lifting machine.

BACKGROUND TO THE INVENTION

Load lifting machines are used to lift, carry and shift payloads. Typically load lifting machines can take the form of front-end loaders, back-end loaders, excavators, dust bin loaders and the like. The payload is typically crushed stone, sand, debris, rubbish or other solid objects that need to be lifted and moved.

It is often desirable to determine the weight of a payload being lifted in a load lifting machine. For example, the weight being transported by a dump truck needs to determine to ensure the truck meets weight restrictions. One way of doing this is by calculating the weight of the individual payloads being loaded into a dump-truck as the load lifting machine fills the truck.

Apparatus exist for determining the weight of a payload being lifted by a load lifting machine. Such apparatus typically look at the pressure of hydraulic fluid in hydraulic actuators as the payload is being lifted by operating the load lifting machine rig. The difficulty with such apparatus is that they are prone to inaccuracy. This is because the base their calculations on assumptions regarding the characteristics of the load lifting machine rig. Often characteristics such as friction are not taken into account.

It is desirable to provide improved accuracy when calculating weight of payloads being lifted by load lifting machines.

SUMMARY OF THE INVENTION

The object of the present invention is to provide a load lifting machine, method and/or apparatus for determining the weight of a payload. This will typically be the payload being lifted by a front-end loader or similar load lifting machine.

In one aspect the present invention may be said to consist in a load lifting machine comprising:
a rig for lifting a payload, the rig comprising at least one actuator adapted to move the rig to lift a payload,
at least one sensor attached to the actuator to measure parameters being or indicative of a force or pressure applied by or existing in the actuator during a lift, and
a processor coupled to the sensor,
wherein the processor is adapted to:
  receive one or more parameters being or indicative of a force or pressure existing in or applied by the actuator during a compensation lift,
  receive one or more parameters being or indicative of a force or pressure existing in or applied by the actuator during a payload lift, and
  determine a weight of the payload during or after a payload lift from the parameters.

Preferably the determined weigh includes a compensation for losses in the rig based on the parameters received during the compensation lift.

Preferably the processor is further adapted to receive one or more parameters relating to rig speed during the compensation lift.

Preferably the load lifting machine comprises an output for communicating a weight to an operator.

Preferably the load lifting machine is a front-end and/or back-end loader and the rig is attached to the front-end and/or back-end of the load lifting machine to manoeuvre objects and debris.

Preferably the rig comprises a bucket for a payload, and one or more moveable arms to support and/or manoeuvre the bucket, wherein the actuator is coupled to one or more of the moveable arms and/or bucket to manipulate the arms to manoeuvre the bucket to perform a payload lift.

Preferably each actuator is a hydraulic actuator, and the one or more sensors are force and/or pressure sensors for measuring a parameter being or indicative of the force applied by each hydraulic actuator on the rig and/or a parameter being or indicative of hydraulic fluid pressure in the hydraulic actuator and/or a parameter being or indicative of the speed of the rig.

Preferably the one or more parameters being or indicative of a force or pressure existing in or applied by the actuator during a compensation lift are received during the raising and lower of the rig, the parameters being used to determine the difference in force required to raised and lower the payload, the difference in force being used as a basis to compensate for loss in the rig.

Preferably a compensation lift comprises lifting the rig up and down using at least one hydraulic cylinder, wherein the processor receives at least four parameters during the compensation lift comprising: a parameter being or indicative of the lift pressure of the hydraulic cylinder as the rig is raised, a parameter being or indicative of the return pressure of the hydraulic cylinder as the rig is raised, a parameter being or indicative of the lift pressure of the hydraulic cylinder as the rig is lowered, a parameter being or indicative of the return pressure of the hydraulic cylinder as the rig is lowered.

Preferably a compensation lift comprises lifting the rig up and down using at least one hydraulic cylinder, wherein the processor further receives the following parameters:
  the Boom Speed as arms are raised,
  the Boom Speed as arms are lowered,
  the Lift Pressure as arms are raised at idle,
  the Return Pressure as arms are raised at idle,
  the Lift Pressure as arms are raised at full throttle,
  the Return Pressure as arms are raised at full throttle,
  the Boom Speed as arms are raised at idle,
  the Boom Speed as arms are raised at full throttle.

Preferably the received one or more parameters being or indicative of a force or pressure existing in or applied by the actuator during a compensation lift, can be used to estimate friction in the rig and/or modify a determination of weight of a payload during a lift to compensate for friction in the rig.

Preferably a payload lift comprises lifting the rig up using at least one hydraulic cylinder, wherein processor receives at least two parameters during the payload lift comprising: a parameter being or indicative of the lift pressure of the hydraulic cylinder as the rig is raised, a parameter being or indicative of the return pressure of the hydraulic cylinder as the rig is raised.

Preferably the processor determines a weight of the payload during or after a payload lift using either:

Weight=((Lift*(1−C))−(k*Return)−Zero)*Span, or

Weight=((Lift*(1−C))−(k*Return)−Zero−C*n*|V|)*Span wherein:
Lift is the lift pressure in the hydraulic cylinder when a payload lift is performed,
Return is the return pressure in the hydraulic cylinder when a payload lift is performed,
k is the rod bore mixing ratio,
Zero is the normal calibration zero,
Span is the normal calibration span,
|V| is the speed of the rig,
C and/or n form the compensation coefficient for friction and/or other losses.
Preferably $$C = \frac{P_{1u} - P_{1d} - k \cdot P_{2u} + k \cdot P_{2d}}{P_{1u} - P_{1d}}, \text{ or}$$

$$C = \frac{P_{1u} - P_{1d} + k(P_{2d} - P_{2u})}{P_{1u} + P_{1d} + n(|V_d| + |V_u|)} \text{ and wherein,}$$

$$n = \frac{P_{1f} - P_{1i} + k(P_{2i} - P_{2f}) + C(P_{1i} - P_{1f})}{C(|V_f| - |V_i|)}$$

where
$P_{1u}$ is the Lift Pressure in the hydraulic cylinder as arms are raised during a compensation lift
$P_{2u}$ is the Return Pressure in the hydraulic cylinder as arms are raised during a compensation lift,
$P_{1d}$ is the Lift Pressure in the hydraulic cylinder as arms are lowered during a compensation lift,
$P_{2d}$ is the Return Pressure in the hydraulic cylinder as arms are lowered during a compensation lift,
k is the Rod Bore mixing ratio,
$V_u$ is the Boom Speed as arms are raised during a compensation lift,
$V_d$ is the Boom Speed as arms are lowered during a compensation lift,
$P_{1i}$ is the Lift Pressure as arms are raised at idle during a compensation lift,
$P_{2i}$ is the Return Pressure as arms are raised at idle during a compensation lift,
$P_{1f}$ is the Lift Pressure as arms are raised at full throttle during a compensation lift,
$P_{2f}$ is the Return Pressure as arms are raised at full throttle during a compensation lift,
$V_i$ is the Boom Speed as arms are raised at idle during a compensation lift, and
$V_f$ is the Boom Speed as arms are raised at full throttle during a compensation lift.

In another aspect the present invention may be said to consist in an apparatus for use with a load lifting machine comprising a rig for lifting a payload, the rig comprising at least one actuator to adapted to move the rig to lift a payload, the apparatus comprising the processor is adapted to:
couple to at least one sensor attached to or for attachment to the actuator to measure parameters being or indicative of a force or pressure applied by or existing in the actuator during a lift,
receive one or more parameters being or indicative of a force or pressure existing in or applied by the actuator during a compensation lift,
receive one or more parameters being or indicative of a force or pressure existing in or applied by the actuator during a payload lift, and
determine a weight of the payload during or after a payload lift from the parameters.

Preferably the determined weigh includes a compensation for losses in the rig based on the parameters received during the compensation lift.
Preferably the processor is further adapted to receive one or more parameters relating to rig speed during a compensation lift.
Preferably the apparatus comprises an output device.
Preferably the apparatus further comprises the at least one sensor coupled to the processor.
Preferably the load lifting machine is a front-end and/or back-end loader.
Preferably the rig comprises a bucket for a payload, and one or more moveable arms to support and/or manoeuvre the bucket wherein an actuator is coupled to one or more of the moveable arms and/or bucket to manipulate the arms to manoeuvre the bucket to perform a payload lift.
Preferably each actuator is a hydraulic actuator and the one or more sensors are force and/or pressure sensors for measuring a parameter being or indicative of the force applied by each hydraulic actuator on the rig and/or a parameter being or indicative of hydraulic fluid pressure in the hydraulic actuator and/or a parameter being or indicative of the speed of the rig.
Preferably the one or more parameters being or indicative of a force or pressure existing in or applied by the actuator during a compensation lift are received during the raising and lower of the rig, the parameters being used to determine the difference in force required to raised and lower the payload, the difference in force being used as a basis to compensate for loss in the rig.
Preferably a compensation lift comprises lifting the rig up and down using a least one hydraulic cylinder, wherein processor receives at least four parameters during the compensation lift comprising: a parameter being or indicative of the lift pressure of the hydraulic cylinder as the rig is raised, a parameter being or indicative of the return pressure of the hydraulic cylinder as the rig is raised, a parameter being or indicative of the lift pressure of the hydraulic cylinder as the rig is lowered, a parameter being or indicative of the return pressure of the hydraulic cylinder as the rig is lowered.
Preferably a compensation lift comprises lifting the rig up and down using at least one hydraulic cylinder, wherein the processor further receives the following parameters:
the Boom Speed as arms are raised,
the Boom Speed as arms are lowered,
the Lift Pressure as arms are raised at idle,
the Return Pressure as arms are raised at idle,
the Lift Pressure as arms are raised at full throttle,
the Return Pressure as arms are raised at full throttle,
the Boom Speed as arms are raised at idle,
the Boom Speed as arms are raised at full throttle.
Preferably the received one or more parameters being or indicative of a force or pressure applied by the actuator during a compensation lift, can be used to estimate friction in the rig and/or modify a determination of weight of a payload during a lift to compensate for friction in the rig.
Preferably a payload lift comprises lifting the rig up using a least one hydraulic cylinder, wherein processor receives at least two parameters during the payload lift comprising: a parameter being or indicative of the lift pressure of the hydraulic cylinder as the rig is raised, a parameter being or indicative of the return pressure of the hydraulic cylinder as the rig is raised.

Preferably the processor determines a weight of the payload during or after a payload lift using:

Weight=((Lift*(1−C))−(k*Return)−Zero)*Span, or

Weight=((Lift*(1−C))−(k*Return)−Zero−C*n*|V|)
*Span wherein:
Lift is the lift pressure in the hydraulic cylinder when a payload lift is performed,
Return is the return pressure in the hydraulic cylinder when a payload lift is performed,
k is the rod bore mixing ratio,
Zero is the normal calibration zero,
Span is the normal calibration span,
|V| is the speed of the rig,
C and/or n form the compensation coefficient for friction and/or other losses.

Preferably Lift and Return pressures are respectively the parameters measured by the one or more sensors being or indicative of a force or pressure existing in or applied by the actuator during a payload lift.

Preferably $$C = \frac{P_{1u} - P_{1d} - k \cdot P_{2u} + k \cdot P_{2d}}{P_{1u} + P_{1d}},$$

or $$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
$P_{1u}$ is the Lift Pressure in the hydraulic cylinder as arms are raised during a compensation lift
$P_{2u}$ is the Return Pressure in the hydraulic cylinder as arms are raised during a compensation lift,
$P_{1d}$ is the Lift Pressure in the hydraulic cylinder as arms are lowered during a compensation lift,
$P_{2d}$ is the Return Pressure in the hydraulic cylinder as arms are lowered during a compensation lift,
k is the Rod Bore mixing ratio,
$V_u$ is the Boom Speed as arms are raised during a compensation lift,
$V_d$ is the Boom Speed as arms are lowered during a compensation lift,
$P_{1i}$ is the Lift Pressure as arms are raised at idle during a compensation lift,
$P_{2i}$ is the Return Pressure as arms are raised at idle during a compensation lift,
$P_{1f}$ is the Lift Pressure as arms are raised at full throttle during a compensation lift,
$P_{2f}$ is the Return Pressure as arms are raised at full throttle during a compensation lift,
$V_i$ is the Boom Speed as arms are raised at idle during a compensation lift, and
$V_f$ is the Boom Speed as arms are raised at full throttle during a compensation lift.

In another aspect the present invention may be said to consist in a method for determining weight of a payload in a load lifting machine, the method comprising lifting the payload with a rig, determining at least one first parameter being or indicative of the force or pressure existing in or applied by the rig during the lift, determining at least one second parameter being or indicative of friction and/or other losses in the rig, and determining a weight of the payload from the first and second parameters.

In another aspect the present invention may be said to consist in a load lifting machine that is adapted to determine a payload lifted by a rig of the load lifting machine, the load lifting machine comprising one or more sensors to determine at least one first parameter being or indicative of the force or pressure existing in or applied by the rig during the lift, and to determine at least one second parameter being or indicative of friction and/or other losses in the rig, the load lifting machine also comprising a processor coupled to the one or more sensors adapted to determine a weight of the payload from the first and second parameters.

In another aspect the present invention may be said to consist in an apparatus for use with a load lifting machine that is adapted to determine a payload lifted by a rig of the load lifting machine, the apparatus comprising or being for use with one or more sensors to determine at least one first parameter being or indicative of the force or pressure existing in or applied by the rig during the lift, and to determine at least one second parameter being or indicative of friction and/or other losses in the rig, the load lifting machine also comprising a processor coupled or for coupling to the one or more sensors adapted to determine a weight of the payload from the first and second parameters.

Preferably the first parameter is used in determining a weight of a payload and the second parameter being or indicative of friction is used to modify the determination to compensate for friction in the rig.

In another aspect the present invention may be said to consist in a method for determining weight of a payload in a loading apparatus, the method comprising receiving at least one first parameter being or indicative of the force or pressure existing in or applied by the rig during a lift, receiving at least one second parameter being or indicative of friction and/or other losses in the rig, and determining a weight of the payload from the first and second parameters.

In another aspect the present invention may be said to consist in a method of determining weight of a payload lifted by a rig of a load lifting machine, the weight being determined from at least one parameter being or indicative of the force or pressure existing in or applied by the rig while the payload is lifted and a compensation for friction and/or other losses in the rig.

Preferably the compensation for friction is determined from a compensation lift where the rig is lifted up and down, wherein the compensation for friction is derived from the difference in one or more rig parameters between the up lift and down lift.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Preferred embodiments of the invention will be described with reference to the following drawings of which.

DETAILED DESCRIPTION OF THE PREFERRED EMBODIMENTS

Figure 1A:
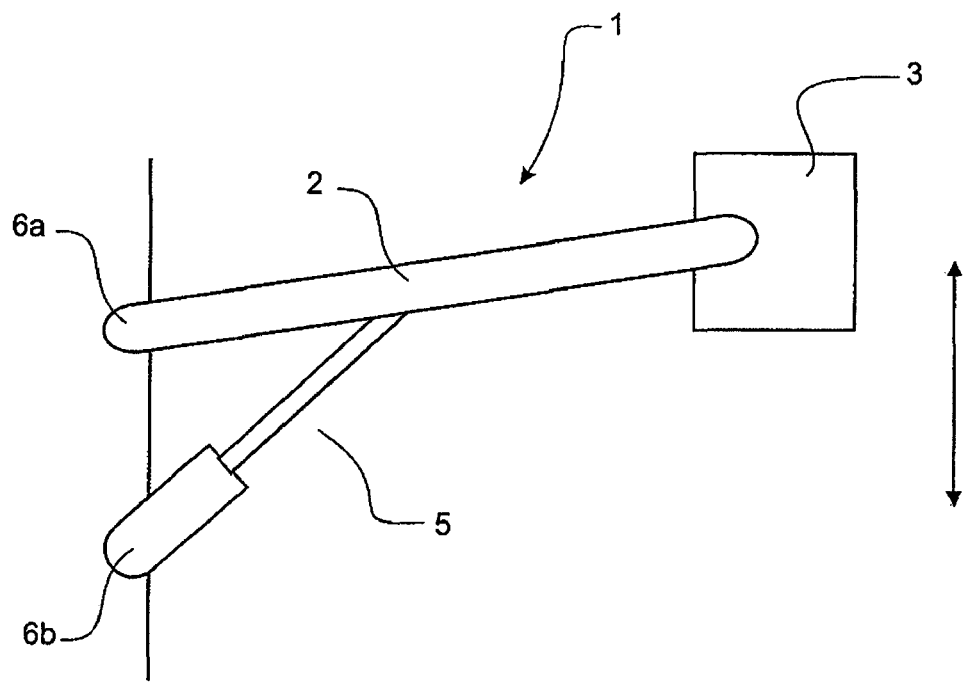
FIG. 1a is a schematic diagram of a genetic loading lifting rig

An embodiment of the invention is described generally in relation to a generic loading rig shown in FIG. 1a. This provides an overview of the invention. The rig 1 comprises a lifting arm 2 adapted to lift a payload 3, for example by way of a bucket or other loading holding means. The lifting arm 2 is moveable around a pivot 6a, which allows for lifting and lowering of the load 3 as shown by the arrow. The arm 2 is moved by way of an actuator 5. This might be, for example, a hydraulic actuator with a cylinder and a ram that extends from and retracts in to the cylinder. Extending the ram lifts the arm 2 and payload 3, while retracting the ram lowers the arm 2 and payload 3. The actuator 5 can pivot as required around pivot 6b. The rig could be used by any type of machinery that is intended to raise and lower a payload 3.

The invention allows for calculation of the weight of the payload 3. Traditional methods for calculating load weight are inaccurate. The applicants have determined that this is at least partially due to the presence of friction and/or other losses present and/or occurring in the payload lifting rig during a lift. Further, the degree of friction varies throughout operation, due to the rig "warming up". The friction within the hydraulic cylinders of the rig is a function of pressure, temperature and in some cases, speed. Pressure primarily varies with load, but can also vary (due to changes in return line pressure) with pressures caused by other hydraulic equipment. The traditional methods of payload weight calculation cannot account for losses due to friction and the like. The present invention provides for an improved weight calculation of a payload by compensating for these losses.

In general, the force required to raise the payload 3 is equal to the force caused by gravity acting on the payload mass, plus any losses. The force required to support the payload while it is being lowered is equal to the force caused by gravity acting on the mass, minus any losses. This can be written as:

$$F_{Raising}=M \cdot g+F_{LossUp} \quad (1)$$

$$F_{Lowering}=M \cdot g-F_{LossDown} \quad (2)$$

where;
$F_{Raising}$ Force required raising the load
M Mass of the load
g Gravitational Constant
$F_{LossUp}$ Force required to overcome losses (such as friction) while raising the load
$F_{Lowering}$ Force required to support the load while lowering
$F_{LossDown}$ Force caused by losses (such as friction) while lowering the load By rearranging and combining (1) and (2) we get;

$$F_{Raising}-F_{LossUp}=F_{Lowering}+F_{LossDown} \quad (3)$$

which in turn becomes;

$$F_{Raising}-F_{Lowering}=F_{LossUp}+F_{LossDown} \quad (4)$$

If now define a new parameter, being the mean of the up and down losses;

$$F_{Loss}=(F_{LossUp}+F_{LossDown})/2 \quad (5)$$

We get;

$$F_{Raising}-F_{Lowering}=2*F_{Loss} \quad (6)$$

Thus, the difference between the force required to raise a given load and the force required to support the same load as it is lowered is equal to twice the mean losses (due to friction or other effects).

This fundamental principle can be used to determine a parameter that is indicative of the losses in a mechanical system. These losses are typically primarily caused by friction of bearings or other rubbing surfaces. The friction is a function of the load applied to said bearings or surfaces. The losses could be due to other factors also. By measuring the friction (and other) losses at any given load, we are able to predict the friction (and other) losses for other applied loads.

Figure 1B:
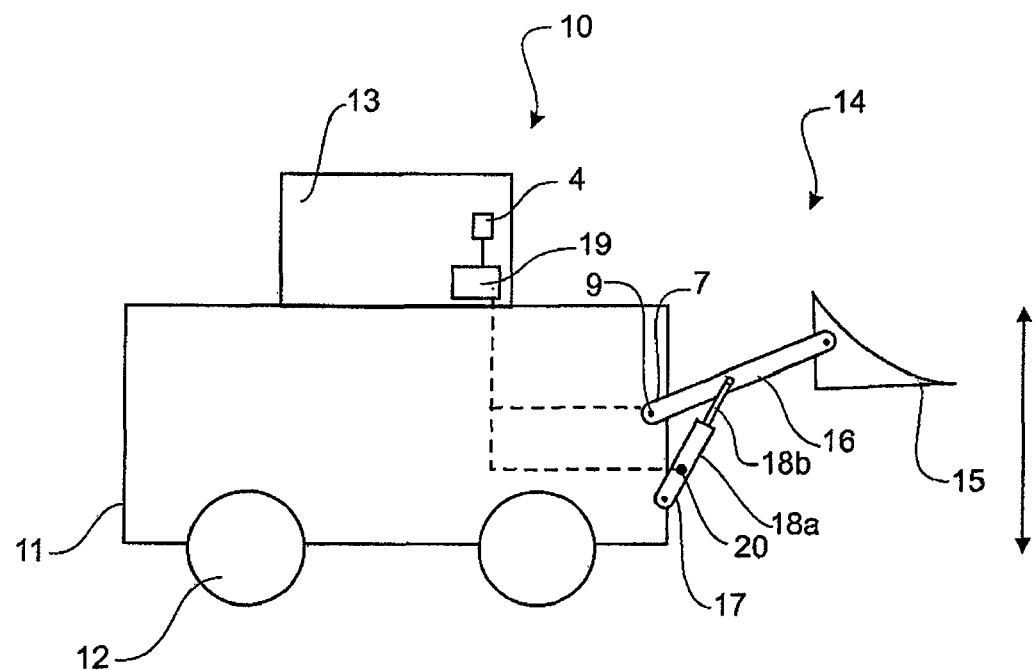
FIG. 1b is a schematic diagram of a load lifting machine.

This concept can be applied to a range of applications where weight calculation of a payload being lifted by lifting rigs is required. A preferred embodiment of the invention is shown in FIG. 1b in which the weight calculation is implemented in respect of a load lifting machine 10. A load lifting machine can be a front-end or wheel loader, back-end loader, excavator, rubbish bin loader or any other loading machine that can lift payloads using a lifting rig. The preferred embodiment relates to a front-end (or wheel-loader), although the invention should not be considered to be restricted to such a machine.

Figure 2:
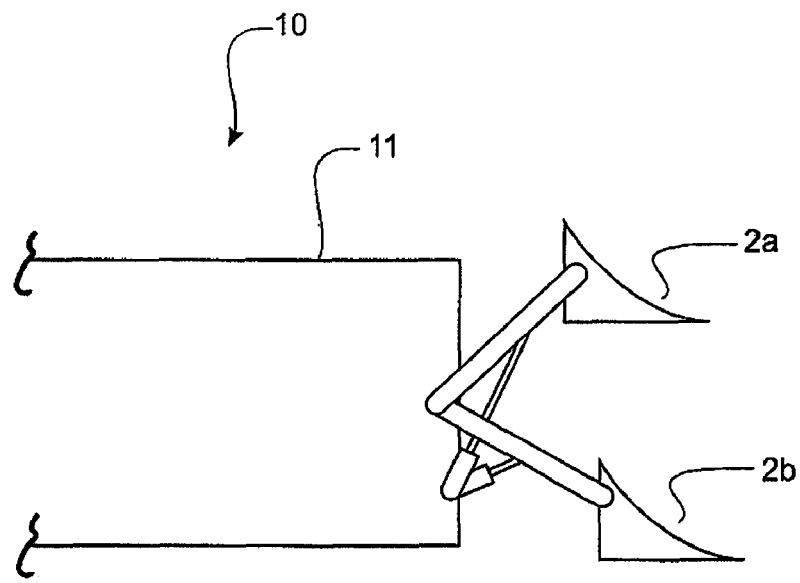
FIG. 2 is a schematic diagram of a rig in raised and lowered positions.

The front-end loader 10 comprises a main body 11 that can be manoeuvred by conveying apparatus such as wheels 12 or continuous tracks. The main body comprises the engine (not shown) for manoeuvring and operating the front-end loader 10 along with the necessary hydraulics system. The front-end loader 10 also comprises a cab or other driver location 13 mounted on the top of the main body 11. A driver can operate the front-end loader 10 from this position. The front-end loader comprises a payload lifting rig 14 attached to the front of the body 11. The rig comprises a load holder 15 for holding a payload and one or more lift arms 16 (one is visible) for attaching the load holder to the main body 11. The load holder 15 can take the form of a bucket, grapple, forks, electromagnet, shovel or other attachment for holding a load. In FIG. 1b, a bucket is shown. The arms 16 are pivotally connected to the bucket 15 and main body 11 to enable manoeuvring of the bucket up and down. A shown in FIG. 2, the bucket can be moved to a raised position 2a, or a lowered position 2b via the arm 16. This enables debris and other objects to be scooped up and then lifted by operation of the arms.

A hydraulic or other actuator 17 is attached to the body 11 and arm 16 in order to operate the rig to lift a payload. In this particular case shown in FIG. 1b, there is a hydraulic actuator 17 coupled between the main body and the arm 16 to raise and lower the arm. The hydraulic actuator comprises a cylinder 18*a*, and a ram 18*b* that extends from and retracts into the cylinder 18*a* under the influence of hydraulic fluid. A lift is performed by extending the ram 18*b* from the hydraulic cylinder 18*a* to push the lift arm 16 in an upwards direction pivoting on the central pivot 7 on the body of the machine. This puts the rig in the raised position 2*a* in FIG. 2. The rig can be lowered 2*b* by retracting the ram 18*b* into the hydraulic cylinder 18*a*. This moves the lift arm 16 in a downwards direction pivoting on the central pivot 7. Additional hydraulic actuators (not shown) could be provided between the arm 16 and the bucket 15. Such actuators could be manipulated to tilt the bucket 15, as required. The hydraulic actuator 17 is operated by the hydraulic system in the main body 11, under the control of an operator in the cab 13.

The front-end loader 10 also comprises components to determine the weight of a payload in the bucket 15. To do so, one or more sensors 20 are placed on or in the hydraulic actuator 17 to measure the pressure of the hydraulic fluid. More particularly each sensor can sense or measure a parameter being or being indicative of, hydraulic fluid pressure in the cylinder 18*a* of the hydraulic actuator 17. This parameter is, or is indicative of, a force or pressure applied by the actuator to the rig or a force or pressure existing in the actuator (such as fluid pressure). In a preferred embodiment, hydraulic fluid pressure is measured by the sensors, although other sensing could take place. For example, a force sensor could measure a parameter that is indicative of a force or pressure applied by the actuator to the rig, or a force or pressure existing in the actuator. The sensors can also measure the speed and/or velocity of the rig as it is raised/lowered. These sensor measured parameters are termed "lift parameters" when they relate to the output of the sensors while the actuators are performing a lift. The sensor(s) pass signals/data back to a main unit 19 that utilizes the parameters from the sensors to calculate or otherwise determine a payload weight. The calculated weight can then be communicated to the operator in the cab 13, via a screen or other output device 4.

The front-end loader 10 also comprises one or more position sensors 9 to determine the position of the arm 16. This allows weight calculation to be triggered at an appropriate time during the lift. These sensors might also measure speed and/or velocity of the rig as it is raised/lowered. The sensors 9 can be placed in any suitable location, for example on or near the pivot 7. This enables the arm 16 position to be determined by its rotation. The position information is fed back to the main unit 19.

It will be appreciated that FIG. 1*b* shows a generic rig for exemplary purposes, and that an actual rig of a front-end loader or other load lifting machine might differ. For example, a rig might comprise multiple arms, and one or more hydraulic actuators to operate each arm.

Figure 3:
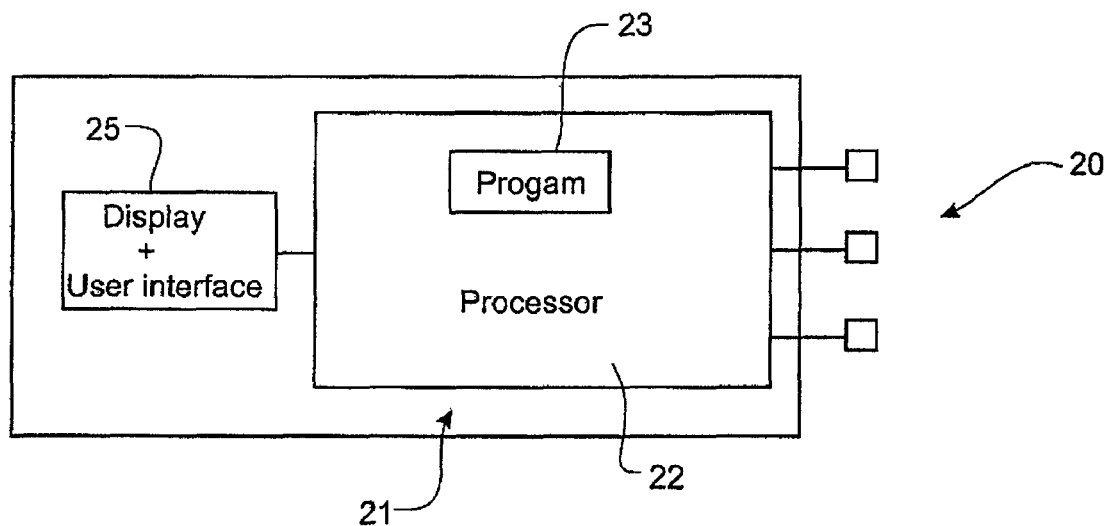
FIG. 3 is a block diagram of a weight calculation apparatus.

FIG. 3 shows an apparatus 21 in accordance with one embodiment of the invention that could be used to calculate or otherwise determine a weight of a payload in a front-end loader. The apparatus 21 can be retrofitted to an existing front-end loader or incorporated into a new front-end loader, such as that shown in FIG. 1*b*. The apparatus 21 comprises a processor 22 that runs a weight calculation program 23 or algorithm. The processor 22 is or can be coupled to one or more sensors 20 attached to the actuator 17 on the lifting rig 14. Preferably, the sensors 20 are pressure sensors that detect the lift and return hydraulic fluid pressures in the actuators 17 they are attached to. Any suitable number of sensors could be used. In a preferred embodiment, there is at least one sensor 20 attached to at least one of the actuators 17 of the rig, although a sensor 20 is not necessarily required for each actuator 17. Each sensor can sense or measure a lift parameter as described earlier. Preferably, this parameter is, or is indicative of, the lift pressure and return pressure of hydraulic fluid in the respective hydraulic actuator as a lift is made. The lift pressure is the pressure of hydraulic fluid at the base of the cylinder that is forcing the ram to extend out of the hydraulic cylinder. The return pressure is the hydraulic fluid pressure at the rod end of the cylinder.

The processor 22 can receive the measured lift parameters (i.e. lift and return pressures) from the one or more sensors 20. It operates the program 23, which utilizes the lift parameters and calculates the weight of the payload being lifted. This can be done as the lift is being performed. Alternatively, the weight can be determined at a later point in time. Preferably, the weight is calculated based on lift parameters that are determined at a trigger point during the lift. The trigger point might be some position the arm moves through between the lowered position 2*b* of the rig and the raised position of the rig 2*a*. The trigger point will be detected by the sensor 9. Preferably, the trigger point is when the arm 16 is clear of the stockpile being moved, and when the arm is about or above horizontal. Other trigger points could be used, however.

The determined weight is then communicated to the operator, for example via a screen or display 25. Alternatively, the weight might be calculated from lift parameters taken at various points, or continuously throughout the lift. The apparatus 21 also comprises a user interface for operating the apparatus 21.

The processor 22 can also determine the intrinsic losses in the rig as the rig is lifted. These are primarily caused by friction, although can be due to other losses also. It does this by receiving lift parameters from the sensors 20 during a compensation lift. The compensation lift involves a raising and lowering of the rig. The difference in the measured parameters from the up and down movements provide an indication of losses. This can be used to compensate for losses during an actual weight calculation lift. The rest of the specification will refer to the losses as being friction, as these are the predominant loss. However, it should be remembered that other losses might be present, which can be compensated for by the present invention. Again, the lift parameter is or is indicative of the lift pressure and return pressure of hydraulic fluid in the respective hydraulic actuator as a lift is made. This parameter is or is indicative of a force or pressure applied by the actuator to the rig, or a force or pressure existing in the actuator.

The processor 22 can determine a (friction) compensation coefficient based on the lift parameters taken from a compensation lift. This coefficient can be used to at least partially compensate for intrinsic friction and/or other losses in the rig 14 when calculating a payload weight. More particularly, during an actual lift, the processor receives lift parameters. From these lift parameters, and the previously calculated compensation coefficient, the processor 22 can use the program 23 to calculate a weight of the payload, in which friction of the rig 14 has at least been partially compensated for. This provides for a more accurate determination of weight.

The program 23 in the processor 22 calculates or otherwise determines the weight of a payload using a program which is created to carry out weight calculations that compensate for friction.

A typical (existing) weight algorithm (for each trigger point) is:

$$\text{Weight} = (\text{Lift} - (k * \text{Return}) - \text{Zero}) * \text{Span} \qquad (7)$$

Where:
Lift is the filtered lift pressure interpolated at a trigger point during a payload lift.

Figure 7:
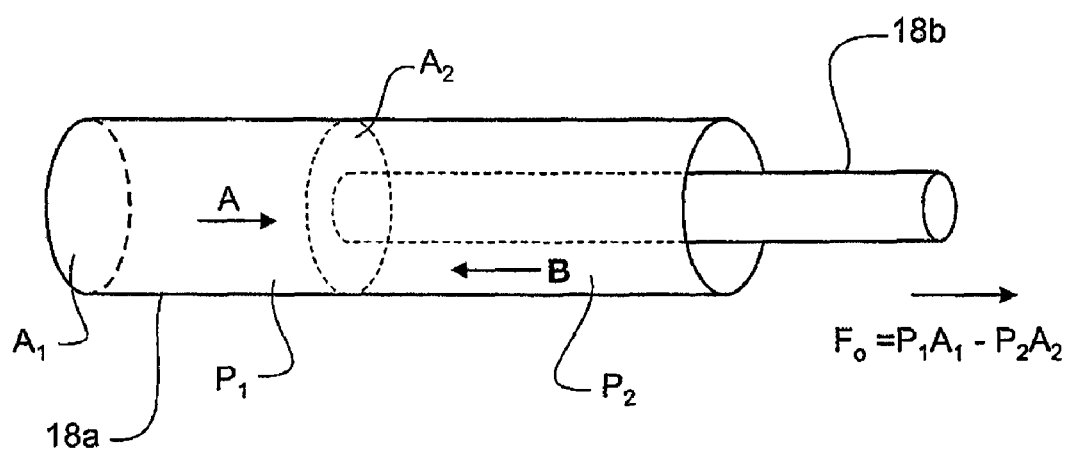
FIG. 7 is a schematic diagram of a hydraulic actuator.

Return is the filtered return pressure interpolated at a trigger point during a payload lift.

k is the rod bore mixing ratio, which is $A_2/A_1$ (as seen in FIG. 7 that is the ratio of the bore cross-sectional area to the rod end cross-sectional area).

Zero is the normal calibration zero.

Span is the normal calibration span.

The program 23 in the processor 22 of the present invention uses a modified to equation (7), which compensates for friction. There are two embodiments. A first embodiment utilises the difference in friction during up and down lifts to determine a compensation coefficient. A second embodiment further utilises velocity to refine the compensation for better accuracy.

Embodiment 1

In the first embodiment, the program 23 implements the following modified version of equation (7) which the inventors have devised.

$$\text{Weight} = ((\text{Lift}*(1-C)) - (k*\text{Return}) - \text{Zero}) * \text{Span} \quad (8)$$

Here, 'C' is the compensation coefficient for friction and/or other losses. 'C' is updated each time the compensation function is performed. It is calculated by;

$$C = \frac{P_{1u} - P_{1d} - k \cdot P_{2u} + k \cdot P_{2d}}{P_{1u} + P_{1d}} \quad (9)$$

$P_{1u}$ is the lift pressure as the lift arms of the rig are raised in a compensation lift, $P_{2u}$ is the return pressure as the lift arms are raised in a compensation lift, $P_{1d}$ is the lift pressure as the lift arms are lowered in a compensation lift, $P_{2d}$ is the return pressure as the lift arms are lowered in a compensation lift, The lift and return pressures mentioned in respect of equations 7 to 9 relate to the pressures (and more particularly the lift parameters) measured by one or more sensors 20 on an actuator 17 operating a lift arm 16. It is possible that such parameters could be obtained from further sensors attached to one or more further lift arms. In this case, the received parameters could be processed and used to create a representative parameter for use in equations 7 to 9.

The value of 'C' should be able to be common for all trigger points.

The derivation of equation 9 is set out in Appendix A.

Span and Zero are the main two parameters that define the relationship between weight and lift pressure (force). The Zero parameter is the pressure (or force) required to lift the empty bucket due to the inherent mass of the rig. Thus, if you subtract the Zero fluid pressure of the pressure required to lift the arms, bucket and any given load, the remainder should be the pressure required for just the payload part.

The Span parameter indicates the relationship between change in pressure and change in load. For example, if an extra 500 PSI was required to lift a load of 1000 kg, then the Span factor would be '2'. Thus if we saw a pressure of 600 PSI (above the 'Zero' pressure value), we would know the load is 600×2=1200 kg.

Zero and Span parameters are determined during initial calibration, usually at the time of installing or configuring the weight calculation apparatus. This is determined by lifting a known test weight. They may be updated from time to time (perhaps yearly), or whenever required.

The applicants have determined that one of the causes of inaccuracies in weight calculation for load lifting machines is the intrinsic friction within the lifting rig 14. Friction is present in each of the moving joints, (typically around 11 bearing sets) and in the internal friction of the hydraulic lift cylinders 18a. As the lifting machine 10 warms up, and as ambient conditions change, this friction changes, in turn causing errors in weight calculation.

Some of the error due to friction can be compensated for by "zeroing" which is a typical technique used by rig operators. Zeroing compensates for build up of debris or other matter in the bucket 15 of the rig 14, which results in inaccurate weight calculation. This can be carried out periodically. However, as the applicants have determined, since friction is primarily a "gain" or "sensitivity" effect, standard zeroing has only a partial impact, typically one third. Further, friction within the hydraulic cylinders 18a is a function of pressure and temperature. The applicants have determined that pressure primarily varies with load but can also vary (due to changes in return line pressure) with pressures caused by other hydraulic equipment.

Embodiment 2

In the second embodiment, the program 23 implements the following modified version of equation (7) which the inventors have devised. Here, a velocity component is included when calculating weight. In effect, a compensation coefficient that includes velocity considerations is used to compensate for friction.

$$\text{Weight} = ((\text{Lift}*(1-C)) - (k*\text{Return}) - \text{Zero} - C*n*|V|) * \text{Span} \quad (8')$$

Here 'C' and 'n' are the compensation coefficients for friction and/or other losses. They are updated each time the 'Zero' function is performed (as described below).

'C' is calculated by:

$$C = \frac{P_{1u} - P_{1d} + k(P_{2d} - P_{2u})}{P_{1u} + P_{1d} + n(|V_d| + |V_u|)} \quad (9')$$

and,

'n' is calculated by:

$$n = \frac{P_{1f} - P_{1i} + k(P_{2i} - P_{2f}) + C(P_{1i} - P_{1f})}{C(|V_f| - |V_i|)} \quad (9'')$$

Where $P_{1u}$ is the Lift Pressure in the hydraulic cylinder as arms are raised during a compensation lift, $P_{2u}$ is the Return Pressure in the hydraulic cylinder as arms are raised during a compensation lift, $P_{1d}$ is the Lift Pressure in the hydraulic cylinder as arms are lowered during a compensation lift, $P_{2d}$ is the Return Pressure in the hydraulic cylinder as arms are lowered during a compensation lift, k is the Rod Bore mixing ratio, $V_u$ is the Boom Speed as arms are raised during a compensation lift, $V_d$ is the Boom Speed as arms are lowered during a compensation lift, $P_{1i}$ is the Lift Pressure as arms are raised at idle during a compensation lift, $P_{2i}$ is the Return Pressure as arms are raised at idle during a compensation lift, $P_{1f}$ is the Lift Pressure as arms are raised at full throttle during a compensation lift, $P_{2f}$ is the Return Pressure as arms are raised at full throttle during a compensation lift, $V_i$ is the Boom Speed as arms are raised at idle during a compensation lift, $V_f$ is the Boom Speed as arms are raised at full throttle during a compensation lift, and

|V| is the Boom Speed in either up or down direction.

Raising and lowering the rig arms at full throttle means that the hydraulic valve is fully open and the engine is run at maximum RPM. Raising and lowering the rig arms at idle means that the hydraulic valve is fully open and the engine is run at idle speed. $P_{1u}$, $P_{2u}$, $P_{1d}$ and $P_{2d}$ can be measured at any suitable engine speed.

The value of 'C' and/or 'n' should be able to be common for all trigger points.

Equations 9' and 9'' can be combined together to produce:

$$C = \frac{(|V_f| - |V_i|)(P_{1u} - P_{1d} + k(P_{2d} - P_{2u})) - (|V_d| + |V_u|)(P_{1f} - P_{1i} + k(P_{2i} - P_{2f}))}{(|V_f| - |V_i|)(P_{1u} + P_{1d}) + (|V_d| + |V_u|)(P_{1i} - P_{1f})} \quad (9''')$$

In this embodiment a weighing method of measuring up and down and/or up at idle and up at full throttle.

The lift and return pressures mentioned in respect of equations 7, 8' and 9'-9''' relate to the pressures (and more particularly the lift parameters) measured by one or more sensors 20 on an actuator 17 operating a lift arm 16. It is possible that such parameters could be obtained from further sensors attached to one or more further lift arms. In this case, the received parameters could be processed and used to create a representative parameter for use in equations 7 to 9.

The coefficients C and n of this embodiment can provide more accuracy in the weight measurement that the compensation coefficient in the first embodiment. This is because velocity of the rig movement is also taken into account. Velocity of the rig can affect friction. The coefficients are scaling factors that are proportional to pressure and velocity The value of 'C' and 'n' should be able to be common for all trigger points.

The derivation of equations 9' to 9''' is set out in Appendix B.

Use of the Coefficients and Equations in Both Embodiments

The equations above (for embodiments 1 and 2) compensate for friction. The remainder of the description relates to use of any embodiment (such as those above) where some type of compensation coefficient is determined. This may be the compensation coefficient C of the first embodiment, or the compensation coefficients C, n (or C*n) of the second embodiment. The singular term "Compensation coefficient" can be taken to refer both C and n jointly. Recalculation of the compensation coefficient can occur periodically by carrying out compensation lifts periodically. The compensation lifts are carried out as and when required to update the compensation coefficient. Each time an updated compensation coefficient is calculated, it is used in the weight calculation for each subsequent payload lift. This compensates for changing friction in the front-end loader rig throughout the day. Once a payload weight is calculated, this can be communicated to the operator via a screen or display 25.

Figure 4:
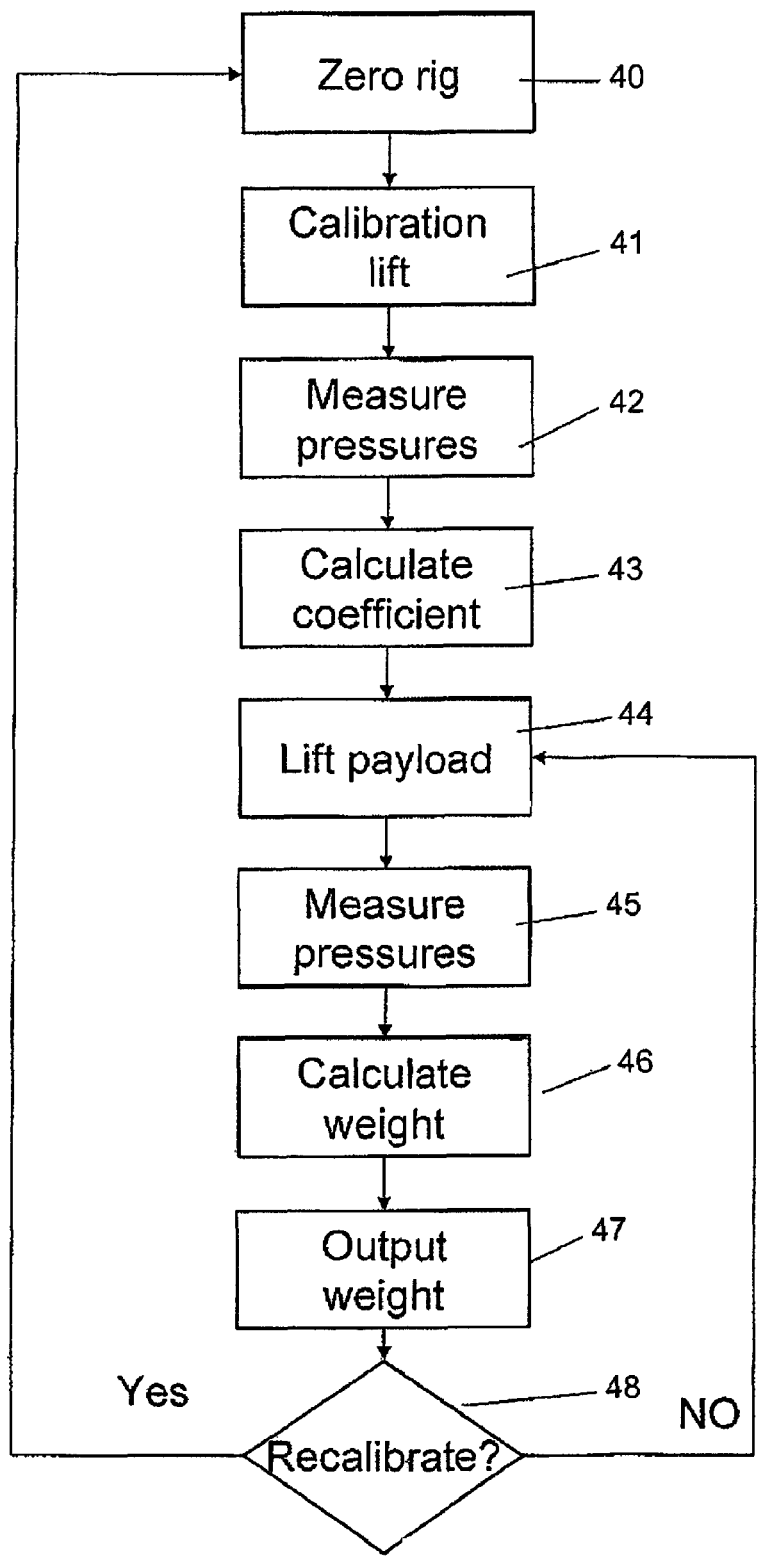
FIG. 4 is a flow diagram of operating a load lifting machine with weight calculation apparatus.

FIG. 4 shows operation of the front-end loader 10 in accordance with an embodiment of the invention. At the beginning of operation of the front-end loader 10 the operator can conduct a zeroing function, step 40, in the normal way known to those skilled in the art. This compensates for leftover debris or other matter in the bucket. This is normally done by lifting up the rig and measuring the weight prior to the actual lift.

The operator can then conduct a compensation (calibration) lift, step 41, in order to enable the processor 22 to determine a compensation coefficient to compensate for friction in the lifting rig 14 during weight calculation. The compensation lift, step 31, comprises the operator lifting the rig 14 and then lowering the rig 14 again. Preferably this is done without a payload in the bucket 15. The zeroing lift could form part of the compensation lift, as the zeroing lift just requires an upwards lift. However, the compensation lift could be a separate lift. As the rig 14 is lifted, the lift pressure on one or more of the hydraulic actuators 17 is measured by one or more sensors 20 attached to those actuators 17. The return pressure is also received by the same or different sensor 20. As the rig 14 is lowered, the lift pressure and return pressure are also measured by the sensor 20, and received by the processor as a lift parameters, step 42. Once the compensation lift is formed, the processor uses the received lift parameters from the sensors to calculate a compensation coefficient using the program 23. The compensation coefficient is calculated in accordance with equation 9 or 9'-9''', as appropriate depending on which embodiment is being used, step 43.

Alternatively the 'Zero' lift or operation and the compensation lift can be combined into the same operation.

The operator can then operate the front-end loader 10 to lift an actual payload as and when required, step 44. When an actual lift takes place the operator will lift the rig 14 from a lowered position 2b to the raised position 2a. At some point during the movement, the lift pressure and return pressure in one or more of the hydraulic cylinders 18a measured and passed to the processor as lift parameters, step 45. The sensors 20 may be measuring continuously, or only at a trigger point. Preferably the processor 22 only uses the received lift parameters at a trigger point. The trigger point will be a position of the rig at any suitable point between the lowered position 2b and raised position 2a. The processor 22 then uses the program 23 to calculate the weight of the payload, step 46. To do so, the program implements equation 8 (or 8' if using the compensation of embodiment 2), and uses the lift parameters measured/received during the actual lift, and the compensation coefficient determined from the last performed compensation lift. The inputs of the sensors are used as the parameters of the equations implemented by the software 23

The calculated weight is then output to the screen or other output device, step 17. The operator can carry out numerous lifts and obtain their weight in the same manner, steps 44-48. However, periodically the operator can carry out another compensation lift as and when required, steps 48 and 41. The operator can conduct a compensation lift optionally between every actual payload lift. Alternatively, a pre-select mode could be operated. In that mode, the operator presses a compensation key on the apparatus and then conducts a compensation lift, when required. Typically in this mode, the operator would carry out a compensation lift periodically throughout the day based on when it seems likely that the intrinsic friction in the rig may have changed and therefore the compensation coefficient needs updating. For example, as the environment and/or the front-end loader's 10 temperature rises, the operator might decide to carry out another compensation lift. Alternatively or in addition, the operator may carry out compensation lifts at specified times, or a specified number of times throughout the day. The compensation lifts can be carried out based on experience of the operator and operating procedures. The compensation coefficient function can be turned off, thereby setting the friction coefficient at zero.

It is not essential for the compensation lift to be carried out prior to an actual lift, although it is preferable. The compensation lift could be carried out after the payload lift.

While in one embodiment the compensation coefficient can be determined at the time of receiving the compensation lift parameters, in an alternative it is possible to simply store these parameters and use them at the same time as calculating the weight from the actual lift parameters, step 53.

Figure 5:
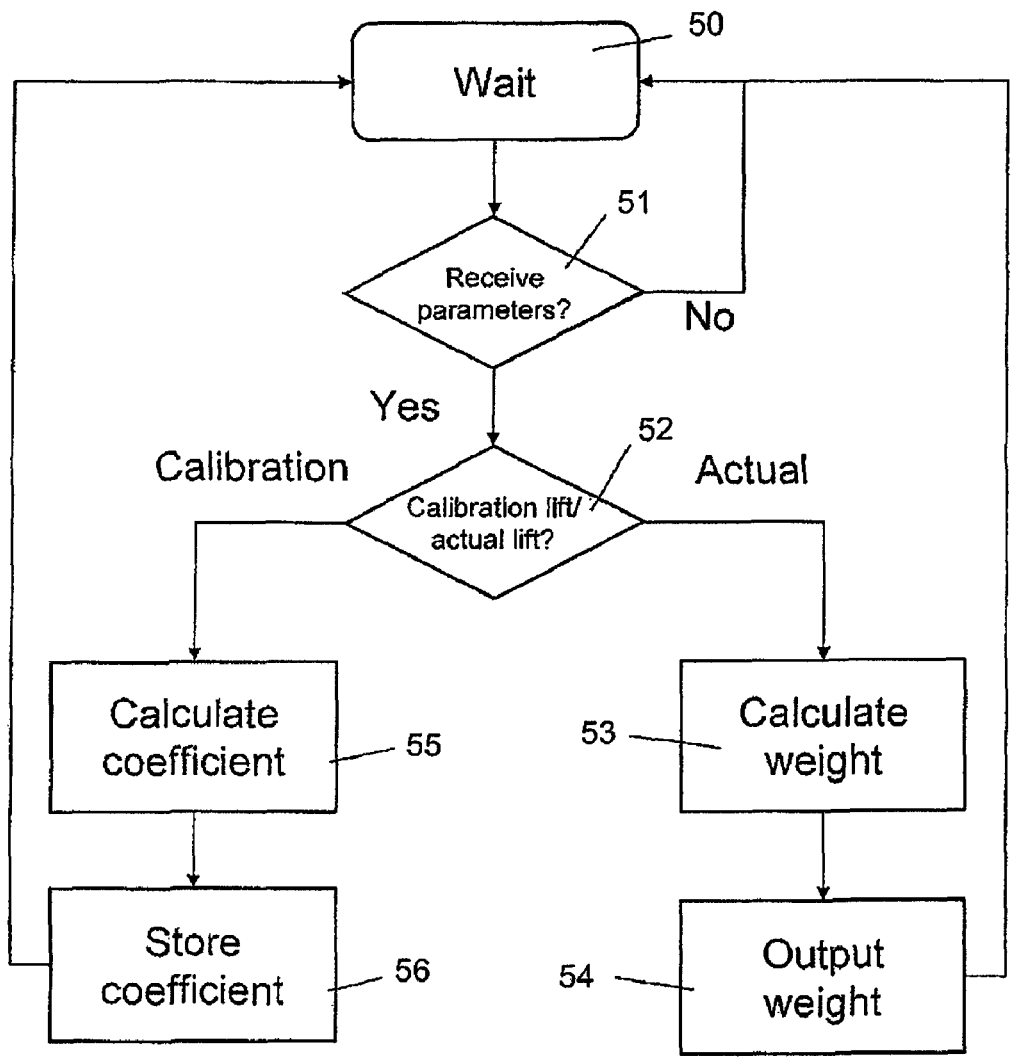
FIG. 5 is a flow diagram of a weight calculation method conducted by software.

FIG. 5 shows operation of the software 23 in the processor 22. The program 23 is normally in a wait cycle, step 50. In this state, the program waits to receive lift parameters. These are the lift parameters that are received by the processor 22 from the sensors 20 either during a compensation lift or actual lift. At step 51, if the program 23 receives parameters, it then determines if these are from a compensation lift or an actual lift, step 52. It can do this from some prompt from the processor 22, for example from user input indicating the type of lift, or some automatic signal from the front-end loader 10 that determines the type of lift. If the received parameters relate to a compensation lift, then the program 23 determines or calculates a compensation coefficient, step 55, and then stores this coefficient step 56. The program then goes back into the wait cycle, steps 50, 51. At step 52, if the program determines that the received parameters are from an actual lift, then the program 23 calculates the weight of the payload from the received parameters, and from the previously calculated compensation coefficient, step 53. The program then outputs information that indicates the weight, which can be displayed by the processor 22 in the display, step 54. After outputting the weight information the program 23 goes back into the wait cycle steps 50, 51. While in one embodiment the compensation coefficient can be determined at the time of receiving the compensation lift parameters, in an alternative it is possible to simply store these parameters and use them at the same time as calculating the weight from the actual lift parameters, step 53.

Figure 6:
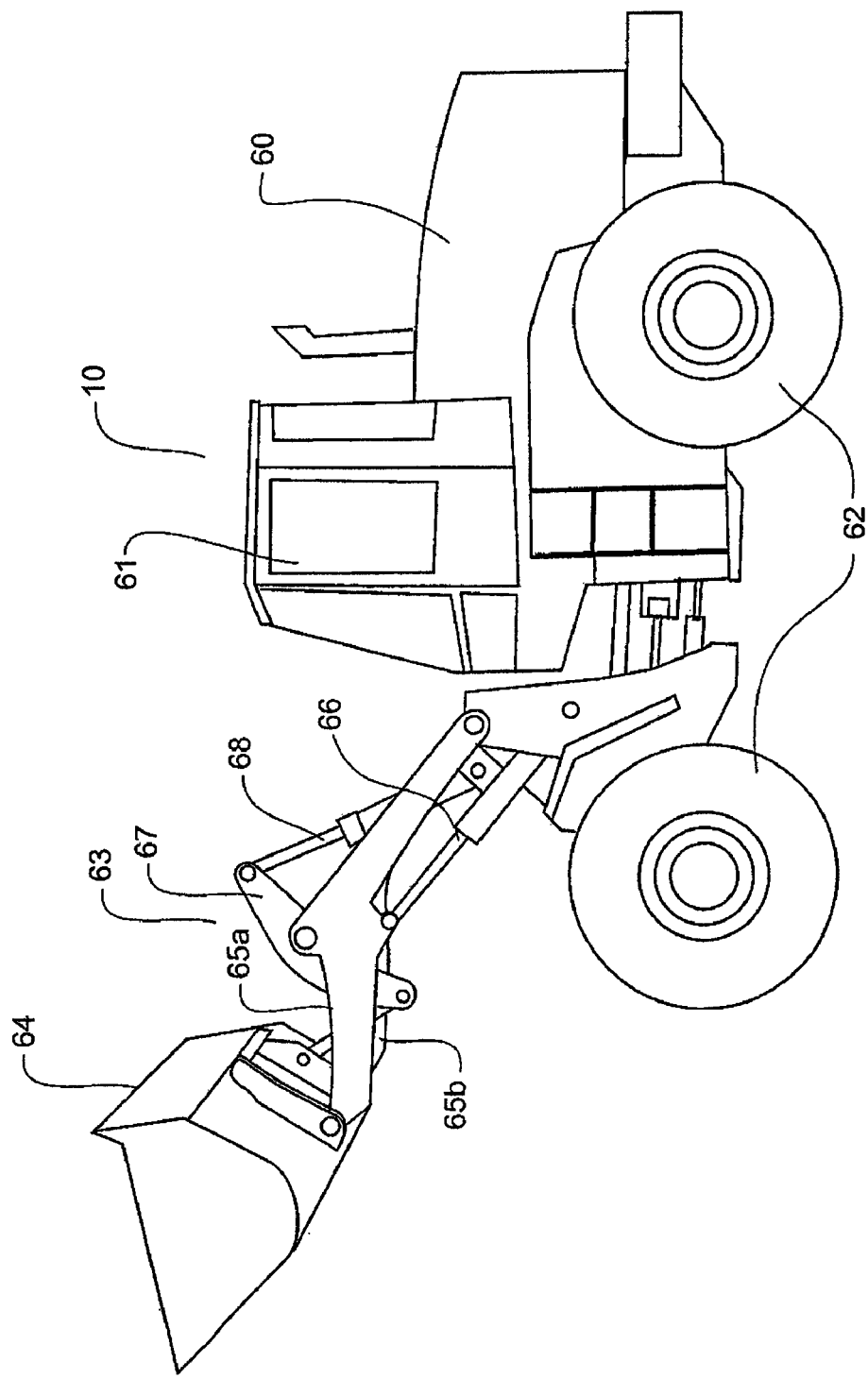
FIG. 6 is an example of a typical front-end loader that may utilise the invention.

FIG. 6 shows an example of a front-end loader 10 that could utilize a weight calculation apparatus that compensates for friction. Such a front end front-end loader comprises a body 60, cab 61 and wheels 62. It also comprises a lifting rig 63 that has a bucket 64 that can be manoeuvred by two lifting arms (65a, 65b). The lifting arms are manoeuvred by hydraulic actuators 66, of which one is shown. Sensors can be placed to measure the fluid pressure in the hydraulic actuator (not shown). The bucket is pivotably attached to one end of the arms 65a, 65b and can be pivoted by way of a linkage system 67 that is operated by a third central hydraulic actuator 68.

An embodiment of the invention can be provided or implemented on any loading machine that utilizes a lifting rig with hydraulic actuators, or other similar actuators. The invention could be also applied to a rope shovel machine operated by electric motor actuators, whereby the difference of forces during a compensation lift could be calculated to compensate for losses in a weight calculation. The machinery shown in FIGS. 1 and 4 and the particular geometry of the lifting rigs are shown by way of example only. The invention could be applied to a range of different lifting rigs with different geometries. An embodiment of the invention could also comprise a load lifting machine comprising an apparatus for payload weight measurement that compensates for friction. An embodiment of the invention also comprises a method of operating such a machine or apparatus. An embodiment of the invention also comprises a method of calculating payload weight that comprises compensating for friction.

In an alternative embodiment, it is possible to measure the forces on the lifting rig using force sensors. A compensation coefficient could be determined in a similar manner by utilizing the output from force sensors during a compensation lift.

It will be appreciated that more than one sensor 20 can be used, if necessary. Preferably at least one sensor is used on each hydraulic cylinder 18a. However, more than one sensor could be used on each hydraulic cylinder to provide further accuracy or other benefits. Alternatively, one or more sensors might be provided on only one of the hydraulic actuators. For example, in some lifting rig embodiments, the hydraulic actuators used are fluidly coupled such that the pressures in each are relatively similar. In this case sensors are only required on one actuator.

The preferred embodiment of the invention could comprise a newly constructed front-end loader with the weight calculation and compensation ability constructed into the front-end loader.

Alternatively an apparatus 21 can be provided that can be retrospectively fitted to a front-end loader 10.

Further, an apparatus could be in the form of a processor 22 that is coupled to existing sensors 20 on a front-end loader 10 that already has an existing weight calculation apparatus. This enables an existing system to be updated, utilizing the existing sensors 20.

Yet further, an existing weight calculation apparatus 21 could be upgraded by updating the software 23 in the processor to calculate a compensation coefficient, and to use this in determining a more accurate weight calculation.

It will be appreciated that while FIG. 3 shows the apparatus 21 comprising a screen 25, processor 22 and sensors 20, it is not necessary for the apparatus to comprise all of these. The apparatus 21 might just comprise the processor, or just the processor and screen. The sensors 20 do not necessarily form part of the apparatus 21 per se, as these may already exist on a machine to which the apparatus 21 is retrofitted. In this case the processor 22 would be coupled to the existing sensors 20.

In general terms, it will be appreciated that the invention could comprise or be provided on any front-end loader 10 that comprises a lifting rig and uses hydraulic 17 or other similar type actuators.

In a further embodiment, a temperature sensor could be added to the rig 14. This could provide the advantage of allowing auto-tuning functionality to tune the values of the friction coefficient between compensation lifts. The additional temperature sensor might have a use in diagnostics also. A service person might be able to relate changes in weight to a change in temperate of any given component, such as hydraulic oil, bearing or the like which could provide advantages.

APPENDIX A

Equation 9 can be derived as follows, with reference to FIG. 7, which shows a schematic diagram of a hydraulic cylinder with a ram extending from the cylinder. The cylinder has a cross-sectional area $A_1$ and the rod side of the piston has a cross-sectional area $A_2$. $A_1$, $A_2$ are the lift and return side areas, respectively. Further, there is a first base-end pressure $P_1$, which is the lift pressure. $P_1$ creates a force that points in the direction shown by arrow A. There is a pressure $P_2$, the return pressure, which exists in the rod-end of the cylinder. $P_2$ creates a force that points in the direction shown by arrow. $F_o$ is the force output of cylinder, which is the difference between the two opposing forces A, B. This is calculated form $F=P_1A_1-P_2A_2$. $F_f$ is the friction force (friction within cylinder)

Now, $$F_o=(P_1 \cdot A_1)-(P_2 \cdot A_2)-F_f \quad (5)$$

when cylinder extending, and $$F_o=(P_1 \cdot A_1)-(P_2 \cdot A_2)+F_f \quad (10)$$

when cylinder retracting, and $$F_f=C \cdot P_1 \quad (11)$$

where equation 10 is an approximation, and $$k = \frac{A_2}{A_1} \quad (12)$$

rewriting these, we get $$k = \frac{Bore^2 - Rod^2}{Bore^2} \text{ and} \quad (13)$$

$$F_0 = P_1 - k \cdot P_2 - C \cdot P_1 \quad (14)$$
$$= P_1 \cdot (1 - C) - k \cdot P_2$$

when cylinder extending, and $$F_0 = P_1 - k \cdot P_2 + C \cdot P_1$$
$$= P_1 \cdot (1+C) - k \cdot P_2$$

when cylinder retracting.

In the above, the units have been ignored. This is done in the real system, as pressures are in A-D counts, the dimensions unit less.

So that just leaves finding 'C' the compensation coefficient. This is a unit less constant representative of the friction coefficient of the cylinder. Conveniently this will also be close to representing the friction coefficient of the beatings. The value of $k.P_2$ is minor error.

In operation, to find 'C' the same load is raised and lowered. If friction is fully compensated for, the effective Force (F) should be the same for up and down.

$$F_{up}=F_{down} \quad (15)$$

$$P_{1u} \cdot (1-C)-k \cdot P_{2u}=P_{1d} \cdot (1+C)-k \cdot P_{2d} \quad (16)$$

$$-P_{1u}(1-C)+P_{1d}(1+C)=-k \cdot P_{2u}+k \cdot P_{2d} \quad (17)$$

$$C \cdot (P_{1u}+P_{1d})=P_{1u}-P_{1d}-k \cdot P_{2u}+k \cdot P_{2d} \quad (18)$$

Therefore, $$C = \frac{P_{1u} - P_{1d} - k \cdot P_{2u} + k \cdot P_{2d}}{P_{1u} + P_{1d}} \quad (19)$$

Where
 $P_{1u}$ is the Lift Pressure in the hydraulic cylinder as arms are raised during a compensation lift,
 $P_{2u}$ is the Return Pressure in the hydraulic cylinder as arms are raised during a compensation lift,
 $P_{1d}$ is the Lift Pressure in the hydraulic cylinder as arms are lowered during a compensation lift,
 $P_{2d}$ is the Return Pressure in the hydraulic cylinder as arms are lowered during a compensation lift,
 k is the Rod Bore mixing ratio.

So, in summary, the sequence is:
1. lift the arms up (smoothly), record pressures at trigger point(s),
2. lower the arms down (smoothly), record pressures at trigger point(s)
3. calculate 'C.'

The load is theoretically not too important. The value of 'C' does alter slightly with load. This could imply that it is better to determine 'C' with a full load rather than empty. However early practical testing has shown that the measurements are much more repeatable (less bounce) with an empty bucket rather than full.

APPENDIX B

Equations 9', 9" can be derived as follows, with reference to FIG. 7, which shows a schematic diagram of a hydraulic cylinder with a ram extending from the cylinder. The cylinder has a cross-sectional area $A_1$ and the rod side of the piston has a cross-sectional area $A_2$. $A_1$, $A_2$ are the lift and return side areas, respectively. Further, there is a first base-end pressure $P_1$, which is the lift pressure. $P_1$ creates a force that points in the direction shown by arrow A. There is a pressure $P_2$, the return pressure, which exists in the rod-end of the cylinder. $P_2$ creates a force that points in the direction shown by arrow. $F_o$ is the force output of cylinder, which is the difference between the two opposing forces A, B. This is calculated form $F=P_1A_1-P_2A_2$. $F_f$ is the friction force (friction within cylinder)

Where;
 $P_1$, $P_2$ Lift and Return pressures (respectively)
 $A_1$, $A_2$ Lift and Return side areas (respectively)
 $F_o$ Force Output of cylinder
 $F_f$ Friction force (friction within cylinder)

Now, $$F_o=(P_1A_1)-(P_2A_2)-F_f \quad (20)$$

when the cylinder is extending, and $$F_o=(P_1A)-(P_2A_2)+F_f \quad (21)$$

when the cylinder is retracting, and $$F_f=CP_1 \quad (11)$$

or, $$F_f=CP_1+Cn|V| \quad (22)$$

Which is an approximation based on separate research.
Also, $$k = \frac{A_2}{A_1} = \frac{Bore^2 - Rod^2}{Bore^2} \quad (23)$$

and, $$F'_o = P_1 - kP_2 - CP_1 - Cn|V| \quad (24)$$
$$= P_1(1 - C) - kP_2 - Cn|V|$$

when the cylinder is extending, and $$F'_o = P_1 - kP_2 + CP_1 + Cn|V| \quad (25)$$
$$= P_1(1 + C) - kP_2 + Cn|V|$$

when the cylinder is retracting.

In the above, the units have been ignored. This is done in the real system, as pressures are in A-D counts, the dimensions unit-less So that just leaves finding the 'C' and/or 'n'. These are unit-less constants representative of the friction coefficient of the cylinder. Conveniently, it will also be close to representing the friction coefficient of the bearings, etc. The value of k.P2 is minor error.

In operation, to find 'C' and/or 'n' the same load is raised and lowered. If friction is fully compensated for, the effective Force (F) should be the same for up and down.

$$F_{up} = F_{down} \quad (15)$$

For the case of 'C' alone $$P_{1u}(1-C) - kP_{2u} = P_{1d}(1+C) - kP_{2d} \quad (26)$$

or, $$P_{1u}(1-C) - P_{1d}(1+C) = kP_{2u} - kP_{2d} \quad (27)$$

rearranging we get, $$\frac{P_{1u} - P_{1d}}{kP_{2u} - kP_{2d}} = 1 - C \quad (28)$$

Therefore:

$$C = \frac{P_{1u} - P_{1d} - kP_{2u} + kP_{2d}}{P_{1u} + P_{1d}} \quad (29)$$

For the case of 'C' and 'n':

$$P_{1u}(1-C) - kP_{2u} - Cn|V_u| = P_{1d}(1+C) - k_{2d} + Cn|V_d| \quad (30)$$

$$C(P_{1u} + P_{1d} + n(|V_d| + |V_u|)) = P_{1u} - P_{1d} + k(P_{2d} - P_{2u}) \quad (31)$$

so, $$C = \frac{P_{1u} - P_{1d} + k(P_{2d} - P_{2u})}{P_{1u} + P_{1d} + n(|V_d| + |V_u|)} \quad (9')$$

To find 'n' a lift at idle and a lift at full throttle can be used, in which case:

$$P_{1i}(1-C) - kP_{2i} - Cn|V_i| = P_{1f}(1-C) - kP_{2f} + Cn|V_f| \quad (33)$$

$$nC(|V_f| - |V_i|) = P_{1f}(1-C) - P_{1i}(1-C) + k(P_{2i} - P_{2f}) \quad (34)$$

so, $$n = \frac{P_{1f}(1-C) - P_{1i}(1-C) + k(P_{2i} - P_{2f})}{C(|V_f| - |V_i|)} \quad (9'')$$

'C' can be found independently from 'n' by combining the above two equations, we get:

$$C = \frac{P_{1u} - P_{1d} + k(P_{2d} - P_{2u})}{P_{1f}(1-C) - P_{1i}(1-C) + P_{1u} + P_{1d} + \frac{k(P_{2i} - P_{2f})}{C(|V_f| - |V_i|)}(|V_d| + |V_u|)} \quad (35)$$

$$C((|V_f| - |V_i|)(P_{1u} + P_{1d}) + (|V_d| + |V_u|)(P_{1i} - P_{1f})) = \quad (36)$$
$$(|V_f| - |V_i|)(P_{1u} - P_{1d} + k(P_{2d} - P_{2u})) -$$
$$(|V_d| + |V_u|)(P_{1f} - P_{1i} + k(P_{2i} - P_{2f}))$$

so, $$C = \frac{(|V_f| - |V_i|)(P_{1u} - P_{1d} + k(P_{2d} - P_{2u})) - (|V_d| + |V_u|)(P_{1f} - P_{1i} + k(P_{2i} - P_{2f}))}{(|V_f| - |V_i|)(P_{1u} + P_{1d}) + (|V_d| + |V_u|)(P_{1i} - P_{1f})} \quad (9''')$$

where
  $P_{1u}$ is the Lift Pressure in the hydraulic cylinder as arms are raised during a compensation lift
  $P_{2u}$ is the Return Pressure in the hydraulic cylinder as arms are raised during a compensation lift,
  $P_{1d}$ is the Lift Pressure in the hydraulic cylinder as arms are lowered during a compensation lift,
  $P_{2d}$ is the Return Pressure in the hydraulic cylinder as arms are lowered during a compensation lift,
  k is the Rod Bore mixing ratio,
  $V_u$ is the Boom Speed as arms are raised during a compensation lift,
  $V_d$ is the Boom Speed as arms are lowered during a compensation lift,
  $P_{1i}$ is the Lift Pressure as arms are raised at idle during a compensation lift,
  $P_{2i}$ is the Return Pressure as arms are raised at idle during a compensation lift,
  $P_{1f}$ is the Lift Pressure as arms are raised at full throttle during a compensation lift,
  $P_{2f}$ is the Return Pressure as arms are raised at full throttle during a compensation lift,
  $V_i$ is the Boom Speed as arms are raised at idle during a compensation lift,
  $V_f$ is the Boom Speed as arms are raised at full throttle during a compensation lift, and
  |V| is the Boom Speed in either up or down direction.

So, in summary, the sequence for determining 'C' alone is:
1. lift the arms up (smoothly), record pressures at trigger point(s),
2. lower the arms down (smoothly), record pressures at trigger point(s),
3. calculate 'C.'

For combined 'C' and 'n' the sequence is:
1. lift the arms up (smoothly), record pressures at trigger point(s),
2. lower the arms down (smoothly), record pressures at trigger point(s),
3. lift the arms up (smoothly) at idle, record pressures and speeds at trigger point(s),
4. lift the arms up (smoothly) at full throttle, record pressures and speeds at trigger point(s),
5. calculate 'C' and hence 'n'.

The load is theoretically not too important. The value of 'C' does alter slightly with load. This could imply that it is better to determine 'C' with a full load rather than empty. However early practical testing has shown that the measurements are much more repeatable (less bounce) with an empty bucket rather than full.

When 'C' and 'n' are both used rather than using four lifts to perform a zero, the operation can be split into two separate steps of a 'C' zero and a speed zero that can alternately be performed. A 'C' zero involves an up and down lift, while a speed zero involves two up lifts.

The invention claimed is:

1. A method for determining weight of a payload lifted by a rig of a load lifting machine comprising:
   receiving a raise parameter that is or is indicative of force or pressure required to raise the rig during a compensation lift,
   receiving a lower parameter that is or is indicative of force or pressure required to lower the rig during a compensation lift,
   receiving a lift parameter that is or is indicative of force or pressure required to lift the payload using the rig,
   calculating a compensation coefficient based on the difference between the raise parameter and the lower parameter, wherein said compensation coefficient compensates for intrinsic losses in the rig; and then
   calculating the weight of the payload using the lift parameters and the compensation coefficient.

2. A method according to claim 1 wherein the rig comprises one or more actuators to raise and lower the rig, wherein:
   the raise parameter is or is indicative of force or pressure existing in or applied by one or more of the actuators while raising the rig during a compensation lift,
   the lower parameter is or is indicative of force or pressure existing in or applied by one or more of the actuators while lowering the rig during a compensation lift, and
   the lift parameter is or is indicative of force or pressure existing in or applied by one or more of the actuators to lift the payload using the rig.

3. A method according to claim 1 further comprising:
   receiving a first speed parameter that is or is indicative of the speed of the rig while the rig is raised during a compensation lift, and
   receiving a second speed parameter that is or is indicative of the speed of the rig while the rig is being lowered during a compensation lift, and
   wherein the compensation coefficient calculation is also based on the difference between the first and second speed parameters.

4. A method according to claim 3 wherein the load lifting machine comprises a hydraulic cylinder coupled to the rig and the weight of the payload is calculated using:

Weight=((Lift*(1−C))−(k*Return)−Zero−C*n*|V|) *Span wherein:
   Lift is a lift pressure in the hydraulic cylinder when a payload lift is performed,
   Return is a return pressure in the hydraulic cylinder when a payload lift is performed,
   k is a rod bore mixing ratio,
   Zero is a normal calibration zero,
   Span is a normal calibration span,
   |V| is a speed of the rig, and
   C and/or n form the compensation coefficient for friction and/or other losses.

5. A method according to claim 4 wherein the rig comprises arms and:

$$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
   $P_{1u}$ is the Lift Pressure in the hydraulic cylinder as the arms are raised during a compensation lift
   $P_{2u}$ is the Return Pressure in the hydraulic cylinder as the arms are raised during a compensation lift,
   $P_{1d}$ is the Lift Pressure in the hydraulic cylinder as the arms are lowered during a compensation lift,
   $P_{2d}$ is the Return Pressure in the hydraulic cylinder as the arms are lowered during a compensation lift,
   k is the Rod Bore mixing ratio,
   $V_u$ is a Boom Speed as the arms are raised during a compensation lift,
   $V_d$ is the Boom Speed as the arms are lowered during a compensation lift,
   $P_{1i}$ is the Lift Pressure as the arms are raised at idle during a compensation lift,
   $P_{2i}$ is the Return Pressure as the arms are raised at idle during a compensation lift,
   $P_{1f}$ is the Lift Pressure as the arms are raised at full throttle during a compensation lift,
   $P_{2f}$ is the Return Pressure as the arms are raised at full throttle during a compensation lift,
   $V_i$ is the Boom Speed as the arms are raised at idle during a compensation lift, and
   $V_f$ is the Boom Speed as the arms are raised at full throttle during a compensation lift.

6. A method according to claim 1 wherein the load lifting machine comprises a hydraulic cylinder coupled to the rig and the weight of the payload is calculated using:

Weight=((Lift*(1−C))−(k*Return)−Zero)*Span, wherein:
   Lift is a lift pressure in the hydraulic cylinder when a payload lift is performed,
   Return is a return pressure in the hydraulic cylinder when a payload lift is performed,
   k is a rod bore mixing ratio,
   Zero is a normal calibration zero,
   Span is a normal calibration span, and
   C forms the compensation coefficient for friction and/or other losses.

7. A method according to claim 6 wherein the rig comprises arms and $$C = \frac{P_{1u} - P_{1d} - k \cdot P_{2u} + k \cdot P_{2d}}{P_{1u} + P_{1d}}$$

where
   $P_{1u}$ is the Lift Pressure in the hydraulic cylinder as the arms are raised during a compensation lift
   $P_{2u}$ is the Return Pressure in the hydraulic cylinder as the arms are raised during a compensation lift,
   $P_{1d}$ is the Lift Pressure in the hydraulic cylinder as the arms are lowered during a compensation lift,
   $P_{2d}$ is the Return Pressure in the hydraulic cylinder as the arms are lowered during a compensation lift,
   k is the Rod Bore mixing ratio.

8. A load lifting machine comprising:
a rig for lifting a payload,
at least one sensor attached to the rig to measure a parameter that is or is indicative of a force or pressure required to raise or lower the rig, and
a processor operatively connected to the sensor for receiving one or more of the following:
a raise parameter that is or is indicative of a force or pressure required to raise the rig during a compensation lift,
a lower parameter that is or is indicative of a force or pressure required to lower the rig during a compensation lift, and
a lift parameter that is or is indicative of a force or pressure required to lift the payload using the rig,
said processor being programmed for
calculating a compensation coefficient that compensates for intrinsic losses in the rig, wherein the compensation coefficient is determined based on the difference between the raise parameter and lower parameter; and then
calculating the weight of the payload using the lift parameter and the compensation coefficient.

9. A load lifting machine according to claim 8 wherein the rig comprises one or more actuators to raise and lower the rig, wherein:
the raise parameter is or is indicative of force or pressure existing in or applied by one or more of the actuators while raising the rig during a compensation lift,
the lower parameter is or is indicative of force or pressure existing in or applied by one or more of the actuators while lowering the rig during a compensation lift, and
the lift parameter is or is indicative of force or pressure existing in or applied by one or more of the actuators to lift the payload using the rig.

10. A load lifting machine according to claim 8 comprising:
at least one sensor attached to the rig to measure a parameter that is or is indicative of the speed of the rig while the rig is raised or lowered during a lift,
wherein the processor is further configured to:
receive a first speed parameter that is or is indicative of the speed of the rig while the rig is raised during a compensation lift,
receive a second speed parameter that is or is indicative of the speed of the rig while the rig is being lowered during a compensation lift,
wherein the calculation of the compensation coefficient is also based on the difference between the first and second speed parameters.

11. A load lifting machine according to claim 10 which comprises a hydraulic cylinder coupled to said rig and wherein the weight of the payload is calculated using:

Weight=((Lift*(1−C))−(k*Return)−Zero−C*n*|V|)*Span wherein:
Lift is a lift pressure in the hydraulic cylinder when a payload lift is performed,
Return is a return pressure in the hydraulic cylinder when a payload lift is performed,
k is a rod bore mixing ratio,
Zero is a normal calibration zero,
Span is a normal calibration span,
|V| is a speed of the rig, and
C and/or n form the compensation coefficient for friction and/or other losses.

12. A load lifting machine according to claim 11 wherein the rig comprises arms and:

$$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
$P_{1u}$ is the Lift Pressure in the hydraulic cylinder as the arms are raised during a compensation lift
$P_{2u}$ is the Return Pressure in the hydraulic cylinder as the arms are raised during a compensation lift,
$P_{1d}$ is the Lift Pressure in the hydraulic cylinder as the arms are lowered during a compensation lift,
$P_{2d}$ is the Return Pressure in the hydraulic cylinder as the arms are lowered during a compensation lift,
k is the Rod Bore mixing ratio,
$V_u$ is a Boom Speed as the arms are raised during a compensation lift,
$V_d$ is the Boom Speed as the arms are lowered during a compensation lift,
$P_{1i}$ is the Lift Pressure as the arms are raised at idle during a compensation lift,
$P_{2i}$ is the Return Pressure as the arms are raised at idle during a compensation lift,
$P_{1f}$ is the Lift Pressure as the arms are raised at full throttle during a compensation lift,
$P_{2f}$ is the Return Pressure as the arms are raised at full throttle during a compensation lift,
$V_i$ is the Boom Speed as the arms are raised at idle during a compensation lift, and
$V_f$ is the Boom Speed as the arms are raised at full throttle during a compensation lift.

13. A load lifting machine according to claim 8 which comprises a hydraulic cylinder coupled to said rig and wherein the weight of the payload is calculated using:

Weight=((Lift*(1−C))−(k*Return)−Zero)*Span, wherein:
Lift is a lift pressure in the hydraulic cylinder when a payload lift is performed,
Return is a return pressure in the hydraulic cylinder when a payload lift is performed,
k is a rod bore mixing ratio,
Zero is a normal calibration zero,
Span is a normal calibration span, and
C forms the compensation coefficient for friction and/or other losses.

14. A load lifting machine according to claim 13 wherein the rig comprises arms and $$C = \frac{P_{1u} - P_{1d} - k \cdot P_{2u} + k \cdot P_{2d}}{P_{1u} + P_{1d}}$$

where
$P_{1u}$ is the Lift Pressure in the hydraulic cylinder as the arms are raised during a compensation lift
$P_{2u}$ is the Return Pressure in the hydraulic cylinder as the arms are raised during a compensation lift, $P_{1d}$ is the Lift Pressure in the hydraulic cylinder as the arms are lowered during a compensation lift, $P_{2d}$ is the Return Pressure in the hydraulic cylinder as the arms are lowered during a compensation lift, k is the Rod Bore mixing ratio.

15. An apparatus for use with a load lifting machine that has a rig for lifting a payload, said apparatus comprising:
- a sensor or an input for coupling to a sensor that receives:
  - a raise parameter that is or is indicative of force or pressure required to raise the rig during a compensation lift,
  - a lower parameter that is or is indicative of force or pressure required to lower the rig during a compensation lift, and
  - a lift parameter that is or is indicative of force or pressure required to lift the payload using the rig; and
- a processor coupled to the sensor or input, the processor being programmed to:
  - calculate a compensation coefficient that compensates for intrinsic losses in the rig, wherein the compensation coefficient is determined based on the difference between the raise parameter and lower parameter; and then
  - calculate the weight of the payload using the lift parameter and the compensation coefficient.

16. An apparatus according to claim 15 wherein the rig comprises one or more actuators to raise and lower the rig, wherein
- the raise parameter is or is indicative of force or pressure existing in or applied by one or more of the actuators while raising the rig during a compensation lift,
- the lower parameter is or is indicative of force or pressure existing in or applied by one or more of the actuators while lowering the rig during a compensation lift, and
- the lift parameter is or is indicative of force or pressure existing in or applied by one or more of the actuators to lift the payload using the rig.

17. An apparatus according to claim 15 wherein
the sensor or the input for coupling to a sensor also receives:
a parameter that is or is indicative of the speed of the rig while the rig is raised or lowered during a lift, and
the processor is further configured to:
receive a first speed parameter that is or is indicative of the speed of the rig while the rig is raised during a compensation lift,
receive a second speed parameter that is or is indicative of the speed of the rig while the rig is being lowered during a compensation lift, and
wherein the calculation of the compensation coefficient is also based on the difference between the first and second speed parameters.

18. A apparatus according to claim 17 wherein the load lifting machine comprises a hydraulic cylinder coupled to the rig and the weight of the payload is calculated using:

Weight=((Lift*(1−C))−(k*Return)−Zero−C*n*|V|)*Span wherein:
Lift is a lift pressure in the hydraulic cylinder when a payload lift is performed,
Return is a return pressure in the hydraulic cylinder when a payload lift is performed,
k is a rod bore mixing ratio,
Zero is a normal calibration zero,
Span is a normal calibration span,
|V| is a speed of the rig, and
C and/or n form the compensation coefficient for friction and/or other losses.

19. An apparatus according to claim 18 wherein the rig comprises arms and:

$$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
$P_{1u}$ is the Lift Pressure in the hydraulic cylinder as the arms are raised during a compensation lift
$P_{2u}$ is the Return Pressure in the hydraulic cylinder as the arms are raised during a compensation lift,
$P_{1d}$ is the Lift Pressure in the hydraulic cylinder as the arms are lowered during a compensation lift,
$P_{2d}$ is the Return Pressure in the hydraulic cylinder as the arms are lowered during a compensation lift,
k is the Rod Bore mixing ratio,
$V_u$ is a Boom Speed as the arms are raised during a compensation lift,
$V_d$ is the Boom Speed as the arms are lowered during a compensation lift,
$P_{1i}$ is the Lift Pressure as the arms are raised at idle during a compensation lift,
$P_{2i}$ is the Return Pressure as the arms are raised at idle during a compensation lift,
$P_{1f}$ is the Lift Pressure as the arms are raised at full throttle during a compensation lift,
$P_{2f}$ is the Return Pressure as the arms are raised at full throttle during a compensation lift,
$V_i$ is the Boom Speed as the arms are raised at idle during a compensation lift, and
$V_f$ is the Boom Speed as the arms are raised at full throttle during a compensation lift.

20. An apparatus according to claim 15 wherein the load lifting machine comprises a hydraulic cylinder coupled to the rig and the weight of the payload is calculated using:

Weight=((Lift*(1−C))−(k*Return)−Zero)*Span, wherein:
Lift is a lift pressure in the hydraulic cylinder when a payload lift is performed,
Return is a return pressure in the hydraulic cylinder when a payload lift is performed,
k is a rod bore mixing ratio,
Zero is a normal calibration zero,
Span is a normal calibration span, and
C forms the compensation coefficient for friction and/or other losses.

21. An apparatus according to claim 20 wherein the rig comprises arms and:

$$C = \frac{P_{1u} - P_{1d} - k \cdot P_{2u} + k \cdot P_{2d}}{P_{1u} + P_{1d}}$$

where
$P_{1u}$ is the Lift Pressure in the hydraulic cylinder as the arms are raised during a compensation lift $P_{2u}$ is the Return Pressure in the hydraulic cylinder as the arms are raised during a compensation lift,
$P_{1d}$ is the Lift Pressure in the hydraulic cylinder as the arms are lowered during a compensation lift,
$P_{2d}$ is the Return Pressure in the hydraulic cylinder as the arms are lowered during a compensation lift,
k is the Rod Bore mixing ratio.

22. A load lifting machine comprising:
a rig for lifting a payload, the rig comprising an actuator adapted to move the rig to lift a payload, said rig also comprising arms,
a sensor attached to the actuator to measure a parameter that is or is indicative of a force or pressure applied by or existing in the actuator during a lift, and
a processor coupled to the sensor,
wherein the processor is adapted to:
receive a first parameter that is or is indicative of a force or pressure existing in or applied by the actuator during a compensation lift,
receive a second parameter that is or is indicative of a force or pressure existing in or applied by the actuator during a payload lift, and
determine a weight of the payload during or after a payload lift from the parameters,
wherein the compensation lift comprises lifting the rig up and down using at least one hydraulic cylinder, wherein the processor further receives the following parameters:
a Boom Speed as the arms are raised,
the Boom Speed as the arms are lowered,
a Lift Pressure as the arms are raised at idle,
a Return Pressure as the arms are raised at idle,
the Lift Pressure as the arms are raised at full throttle,
the Return Pressure as the arms are raised at full throttle,
the Boom Speed as the arms are raised at idle,
the Boom Speed as the arms are raised at full throttle.

23. A load lifting machine comprising:
a rig for lifting a payload, the rig comprising at least one actuator adapted to move the rig to lift a payload, said actuator comprising a hydraulic cylinder,
at least one sensor attached to the actuator to measure parameters being or indicative of a force or pressure applied by or existing in the actuator during a lift, and
a processor coupled to the sensor,
wherein the processor is adapted to:
receive one or more parameters being or indicative of a force or pressure existing in or applied by the actuator during a compensation lift,
receive one or more parameters being or indicative of a force or pressure existing in or applied by the actuator during a payload lift, and
determine a weight of the payload during or after a payload lift from the parameters,
wherein the processor determines the weight of the payload during or after the payload lift using either:

Weight=((Lift*(1−C))−(k*Return)−Zero)*Span, or

Weight=((Lift*(1−C))−(k*Return)−Zero−C*n*|V|)*Span wherein:
Lift is a lift pressure in the hydraulic cylinder when a payload lift is performed,
Return is a return pressure in the hydraulic cylinder when a payload lift is performed,
k is a rod bore mixing ratio,
Zero is a normal calibration zero,
Span is a normal calibration span,
|V| is a speed of the rig,
C and/or n form a compensation coefficient for friction and/or other losses.

24. A load lifting machine according to claim 23 wherein the rig comprises arms and $$C = \frac{P_{1u} - P_{1d} - k \cdot P_{2u} + k \cdot P_{2d}}{P_{1u} + P_{1d}}, \text{ or}$$

$$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
$P_{1u}$ is the Lift Pressure in the hydraulic cylinder as the arms are raised during a compensation lift
$P_{2u}$ is the Return Pressure in the hydraulic cylinder as the arms are raised during a compensation lift,
$P_{1d}$ is the Lift Pressure in the hydraulic cylinder as the arms are lowered during a compensation lift,
$P_{2d}$ is the Return Pressure in the hydraulic cylinder as the arms are lowered during a compensation lift,
k is the Rod Bore mixing ratio,
$V_u$ is a Boom Speed as the arms are raised during a compensation lift,
$V_d$ is the Boom Speed as the arms are lowered during a compensation lift,
$P_{1i}$ is the Lift Pressure as the arms are raised at idle during a compensation lift,
$P_{2i}$ is the Return Pressure as the arms are raised at idle during a compensation lift,
$P_{1f}$ is the Lift Pressure as the arms are raised at full throttle during a compensation lift,
$P_{2f}$ is the Return Pressure as the arms are raised at full throttle during a compensation lift,
$V_i$ is the Boom Speed as the arms are raised at idle during a compensation lift, and
$V_f$ is the Boom Speed as the arms are raised at full throttle during a compensation lift.

25. An apparatus for use with a load lifting machine comprising a rig for lifting a payload, the rig comprising at least one actuator adapted to move the rig to lift a payload and said rig also comprising arms, the apparatus comprising a processor adapted to:
couple to at least one sensor attached to or for attachment to the actuator to measure parameters being or indicative of a force or pressure applied by or existing in the actuator during a lift,
receive one or more parameters being or indicative of a force or pressure existing in or applied by the actuator during a compensation lift,
receive one or more parameters being or indicative of a force or pressure existing in or applied by the actuator during a payload lift, and
determine a weight of the payload during or after a payload lift from the parameters,
wherein the compensation lift comprises lifting the rig up and down using at least one hydraulic cylinder, wherein the processor further receives the following parameters:

a Boom Speed as the arms are raised,
the Boom Speed as the arms are lowered,
a Lift Pressure as the arms are raised at idle,
a Return Pressure as the arms are raised at idle,
the Lift Pressure as the arms are raised at full throttle,
the Return Pressure as the arms are raised at full throttle,
the Boom Speed as the arms are raised at idle,
the Boom Speed as the arms are raised at full throttle.

26. An apparatus for use with a load lifting machine comprising a rig for lifting a payload, the rig comprising at least one actuator to adapted to move the rig to lift a payload, said actuator comprising a hydraulic cylinder, the apparatus comprising a processor adapted to:
 couple to at least one sensor attached to or for attachment to the actuator to measure parameters being or indicative of a force or pressure applied by or existing in the actuator during a lift,
 receive one or more parameters being or indicative of a force or pressure existing in or applied by the actuator during a compensation lift,
 receive one or more parameters being or indicative of a force or pressure existing in or applied by the actuator during a payload lift, and
 determine a weight of the payload during or after a payload lift from the parameters,
 wherein the processor determines the weight of the payload during or after the payload lift using:

Weight=((Lift*(1−$C$))−($k$*Return)−Zero)*Span, or

Weight=((Lift*(1−$C$))−($k$*Return)−Zero−$C$*$n$*|$V$|)*Span wherein:
 Lift is a lift pressure in the hydraulic cylinder when a payload lift is performed,
 Return is a return pressure in the hydraulic cylinder when a payload lift is performed,
 k is a rod bore mixing ratio,
 Zero is a normal calibration zero,
 Span is a normal calibration span,
 |V| is a speed of the rig, and
 C and/or n form a compensation coefficient for friction and/or other losses.

27. An apparatus according to claim 26 wherein the rig comprises arms and $$C = \frac{P_{1u} - P_{1d} - k \cdot P_{2u} + k \cdot P_{2d}}{P_{1u} + P_{1d}}, \text{ or}$$

$$C = \frac{P_{1u} - P_{1d} + k(P_{2d} - P_{2u})}{P_{1u} + P_{1d} + n(|V_d| + |V_u|)}$$

and wherein, $$n = \frac{P_{1f} - P_{1i} + k(P_{2i} - P_{2f}) + C(P_{1i} - P_{1f})}{C(|V_f| - |V_i|)}$$

where
 $P_{1u}$ is the Lift Pressure in the hydraulic cylinder as the arms are raised during a compensation lift
 $P_{2u}$ is the Return Pressure in the hydraulic cylinder as the arms are raised during a compensation lift,
 $P_{1d}$ is the Lift Pressure in the hydraulic cylinder as the arms are lowered during a compensation lift,
 $P_{2d}$ is the Return Pressure in the hydraulic cylinder as the arms are lowered during a compensation lift,
 k is the Rod Bore mixing ratio,
 $V_u$ is a Boom Speed as the arms are raised during a compensation lift,
 $V_d$ is the Boom Speed as the arms are lowered during a compensation lift,
 $P_{1i}$ is the Lift Pressure as the arms are raised at idle during a compensation lift,
 $P_{2i}$ is the Return Pressure as the arms are raised at idle during a compensation lift,
 $P_{1f}$ is the Lift Pressure as the arms are raised at full throttle during a compensation lift,
 $P_{2f}$ is the Return Pressure as the arms are raised at full throttle during a compensation lift,
 $V_i$ is the Boom Speed as the arms are raised at idle during a compensation lift, and
 $V_f$ is the Boom Speed as the arms are raised at full throttle during a compensation lift.

\* \* \* \* \*